Patented Oct. 6, 1936

2,056,836

UNITED STATES PATENT OFFICE 2,056,836

ELASTIC BODY FOR COATING METAL AND OTHER USES

Werner W. Duecker and Claron R. Payne, Pittsburgh, Pa., assignors to Texas Gulf Sulphur Company, a corporation of Texas No Drawing. Application September 4, 1934, Serial No. 742,641

1 Claim. (Cl. 106—22)

This invention relates to the production of elastic and rubber-like bodies, and the coating of articles of metal therewith.

Effort in the past has been made to vulcanize upon the surfaces of metal articles an adherent, rubber-like coating, but without success.

We have discovered a composition of a plastic with particular metal compounds that, being applied to metal surfaces and vulcanized in situ, affords the desired result. Our composition, being vulcanized, is converted into a rubber-like mass of permanent character, and as such is of wider and general utility; but, as a coating for metal, it finds immediate practical use.

There is a class of plastics, known to industry, that consists of or includes the mutual solution of sulphur and olefine sulphide. Such an article is disclosed in United States Letters Patent No. 1,890,231, granted December 6, 1932, on the application of Joseph C. Patrick and Nathan M. Mnookin; such another article is disclosed in an application for Letters Patent, filed March 22, 1933, by Werner W. Duecker, one of the present applicants, Serial No. 662,113. It is known that plastics of this class may be converted into elastic, flexible, rubber-like bodies by vulcanization in the presence of an accelerator, together with zinc oxide, and, ordinarily, other compounds commonly used in the vulcanization of rubber. The plastics, however, so responsive to vulcanization are narrowly limited to a small content of elemental sulphur.

We have discovered that, by employing certain compounds of other particular electro-positive elements, and, specifically a halide of mercury, copper, silver, or lead, plastic bodies of the class defined may by vulcanization be converted into rubber-like bodies; that the presence of neither an accelerator nor other associated or assisting material is required; that the product is of superior quality; that its content of elemental sulphur may be high; and that if the material be prepared, applied to, and vulcanized upon, the surface of an article of metal, a union of intimate and durable character will be effected, the metal successfully coated with the elastic and inert product.

Masses containing, by weight, 25 parts of olefine sulphide and 75 parts of sulphur, for example, may be converted into rubber-like bodies by treating them at vulcanizing temperature (120°– 210° C.) with 2.5 parts of a compound of the class defined above,—a halide of mercury, copper, silver, or lead.

This material may be simultaneously vulcanized and bonded directly to metal,—to steel, for example. This is an accomplishment not heretofore possible with the olefine sulphides.

The material is prepared, advantageously, in a rubber mill, and to obtain a consistency such as to render rubber-mill operation easy, we have found it desirable to include in the composition, not our metal compound only, but an accelerator also, and associated with it a certain amount of zinc oxide. Such an addition of an accelerator in association with zinc oxide is a known expedient for rendering an olefine sulphide less viscous. This old expedient of reducing the viscosity of an olefine sulphide, as heretofore practiced, does not admit of association with the sulphide of any substantial content of elemental sulphur; in our preparation however, a large elemental sulphur content is contemplated and is advantageously provided.

In a companion application, filed Sept. 4, 1934, Serial No. 742,642, we describe and claim the composition with a mutual solution of sulphur and olefine sulphide of a halogen, or a halide, oxide, or sulphide of an electro-negative element—arsenic, for example, or phosphorus, with consequence and effect that the viscosity of the mass is reduced. And it is possible, in the practice of this present invention, and in order to render the material responsive to rubber-mill operation to employ as an agent for reducing viscosity, not a rubber accelerator in association with zinc oxide, but a halogen or a halide, and oxide, or a sulphide of an electro-negative element—arsenic sulphide, for example. The ratio of such addition will be carefully controlled, and only enough added to effect the desired reduction in viscosity. An excess quantity has a tendency to impair the desired rubber-like quality of the product in view.

The following mixture may be directly prepared and applied to and vulcanized upon steel. The result being a sheet of metal covered with a flexible, rubber-like film.

| | | |
|---|---|---|
| Sulphur | 50 | parts by weight |
| Olefine sulphide | 50 | parts by weight |
| Mercuric chloride | 5 | parts by weight |
| Zinc oxide | 5 | parts by weight |
| Diphenyl guanidine | 0.17 | parts by weight |
| Carbon black | 33 | parts |

The carbon black content is of no intrinsic value in the process under consideration. Its value is that it gives to the product a certain desired physical characteristic.

The elastic flexible rubber-like masses, because they contain a large proportion of sulphur, are cheaper than similiar masses made with the olefine sulphide alone. They may be used wherever rubber is used. They may be bonded directly to metal. They may be used to increase the adhesion of metal to rubber, being applied as an intermediate material.

Metal covered with this rubber-like material may be used in the fabrication of battery boxes, tanks, ducts, roofing materials, and as an abrasion-resistant coating.

We claim as our invention:

A rubber-like body consisting of a mutual solution of sulphur and olefine sulphide in substantially the ratio of 75 parts of sulphur to 25 parts of sulphide, vulcanized in the presence of substantially 2.5 parts of chloride of mercury.

WERNER W. DUECKER
CLARON R. PAYNE.